United States Patent [19]

Maeda

[11] Patent Number: 5,257,125
[45] Date of Patent: Oct. 26, 1993

[54] AFOCAL OPTICAL SYSTEM FOR FOCUS ERROR CORRECTION IN LASER SCANNING SYSTEMS

[75] Inventor: Patrick Y. Maeda, Redondo Beach, Calif.

[73] Assignee: Xerox Corporation, Stamford, Conn.

[21] Appl. No.: 982,324

[22] Filed: Nov. 27, 1991

[51] Int. Cl.⁵ .............................................. G02B 26/08
[52] U.S. Cl. .................... 359/196; 359/210; 359/216; 250/201.4
[58] Field of Search ............... 359/196, 216, 217, 218, 359/219, 201, 209, 210; 250/234, 235, 236, 201.4

[56] References Cited

U.S. PATENT DOCUMENTS

| | | | |
|---|---|---|---|
| 4,163,600 | 8/1979 | Russell | 359/216 |
| 4,712,887 | 12/1987 | Baer | 359/210 |
| 5,033,806 | 7/1991 | Tomita et al. | 359/216 |
| 5,054,866 | 10/1991 | Tomita et al. | 359/201 |

Primary Examiner—Loha Ben
Attorney, Agent, or Firm—Fariba Rad

[57] ABSTRACT

A raster scanning system is disclosed which utilizes a focus error correction system and a pre-polygon cross-scan cylindrical lens for correcting focus error both in the fast-scan plane and in the cross-scan plane without affecting the scan characteristics of the post polygon optics. The focus error correction system comprises at least two lenses which can be either spherical or fast-scan cylindrical lenses and one of the lenses must be axially adjustable. By adjusting the adjustable lens, a positive or a negative optical power can be added to a beam passing through the focus error correction system in order to correct the focus error in the fast-scan plane. The pre-polygon cross-scan cylindrical lens is also adjustable to correct the focus error in the cross-scan plane.

10 Claims, 5 Drawing Sheets

AFOCAL OPTICAL SYSTEM FOR FOCUS ERROR CORRECTION IN LASER SCANNING SYSTEMS

BACKGROUND OF THE INVENTION

This invention relates to a raster scanner, and more particularly, to a raster scanner optical system which corrects a focus error caused by manufacturing tolerances of the optical elements of the raster scanner.

Raster scanner optical systems contained in the prior art have a light source, such as a laser, which emits a coherent light beam. The beam is collimated in both the fast-scan or tangential plane and in the cross-scan or sagittal plane by multiple optical elements. The collimated beam in the cross-scan plane is focussed at a point near a facet of a rotating polygon mirror by a cylindrical optical element while in the fast-scan plane the light beam remains collimated when the beam strikes the facet of the rotating polygon mirror.

The rotating polygon mirror causes the reflected beam to revolve about an axis near the reflection point of the rotating polygon mirror. This reflected beam can be utilized to scan a document at the input end of an imaging system as a raster input scanner or can be used to impinge upon a photosensitive medium, such as a xerographic drum (photoreceptor), in the output mode as a raster output scanner.

Typically, an optical element has manufacturing tolerances such as surface radii, element thickness or refractive index which can cause a slight deviation in the divergence of a light beam. In a raster scanner, which has a plurality of optical elements, the error caused by each optical element is cumulative. Consequently, manufacturing tolerances of the optical elements can substantially shift the focal point of the light beam from a point on the photoreceptor plane to a point outside of the photoreceptor plane which degrades the quality of the printed document.

Depending on the parameters of the raster scanner, the depth of focus, which defines the acceptable range of the focus error, varies. The low resolution raster scanners (i.e. 400 SPI), have a larger depth of focus compared to high resolution raster scanners (i.e. 600 SPI). Therefore, the low resolution raster scanners are more tolerant to the focus errors. On the contrary, the high resolution raster scanners are frequently impacted by the manufacturing tolerances of the optical elements. Usually, in a high resolution raster scanner with a small allowable depth of focus, the amount of the focus error is larger than the depth of focus.

To solve this problem, an option is to use optical elements with tight tolerances. However, this recourse is cost prohibitive and impractical.

Furthermore, the acceptable focus error in the fast-scan plane may be different than the focus error in the cross-scan plane. Since different optical elements are utilized to differentiate the light beam in the fast-scan plane from the light beam in the cross-scan plane, the conjugates in the fast-scan plane are different than the conjugates in the cross-scan plane. Therefore, the focus error in the fast-scan plane has to be corrected in a different manner than the focus error in the cross-scan plane.

Also, if the spot is elliptically shaped, the size of the spot in the fast-scan plane is smaller than the size of the spot in the cross-scan plane. Consequently, the allowable depth of focus in the fast-scan plane is smaller than the allowable depth of focus in the cross-scan plane which makes it more challenging to correct the focus error in the fast-scan plane than in the cross-scan plane.

Ordinarily, a pre-polygon cylindrical lens which only affects the light beam in the cross-scan plane is used to correct the focus error in the cross-scan plane. However, the focus error in the fast-scan plane remains unaffected. To "correct the focus error" as used herein shall mean moving the focus into the range defined as "allowable depth of focus" which is the acceptable range of the focus error.

It is an object of this invention to provide optical means to correct the focus error, caused by the manufacturing tolerances of the optical elements of the raster scanner, in both the fast-scan and cross-scan planes.

SUMMARY OF THE INVENTION

In accordance with the present invention, an afocal Galilean focus error correction system is positioned between a collimator and a pre-polygon cross-scan cylindrical optical element of a laser diode raster scanner optical system. The afocal Galilean focus error correction system, which comprises at least two lenses, one of which is axially adjustable, in conjunction with an axially adjustable pre-polygon cross-scan cylindrical lens provide an adjustment system to correct a focus error both in the fast-scan plane and in the cross-scan plane.

DESCRIPTION OF THE PREFERRED EMBODIMENT

Figure 1:
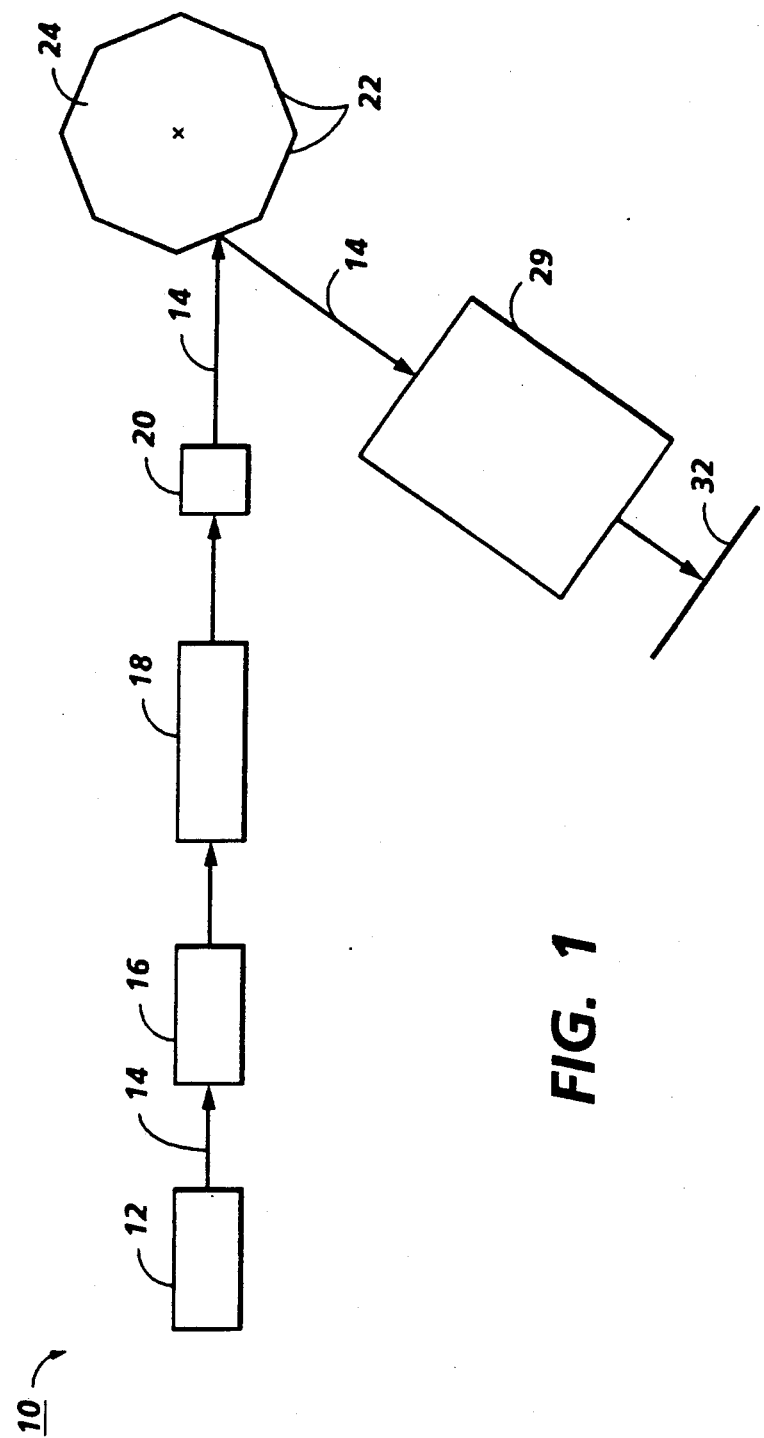
FIG. 1 is a tangential schematic view of a raster scanning system of this invention incorporating an afocal Galilean focus error correction system.

Reference is now made to FIG. 1 wherein there is disclosed a raster scanner optical system 10. A laser diode light source 12 emits a coherent light beam 14 which is collimated in both the fast-scan and cross-scan planes by an optical collimator 16. The resulting collimated beam passes through an afocal Galilean focus error correction system 18. It should be noted that an afocal system is a system which alters the diameter of a collimated light beam while maintaining the collimation of the light beam. The focus error correction system 18, which corrects the focus error caused by manufacturing tolerances of any of the optical elements of the raster scanner 10, will be described in greater detail hereinafter. A Lens 20 is cylindrical in the cross-scan plane and planar in the fast-scan plane. Thus, the lens 20 converges the beam 14 in the cross-scan plane while maintaining the collimation of the beam 14 in the fast-scan plane. In the cross-scan plane, the lens 20 focuses the beam on a facet 22 of a multi-faceted rotating polygon mirror 24 in the fast-scan plane the beam 14 remains collimated when the beam strikes the facet.

The beam 14 reflected from the facet 22 is still collimated in the fast-scan plane and is diverging in the cross-scan plane. The reflected beam 14 then passes through post polygon optics 29 which focuses the reflected light beam in both fast-scan plane and in the cross-scan plane on a photoreceptor plane 32. The post polygon optics are the common elements used in any raster scanning system.

Figure 2:
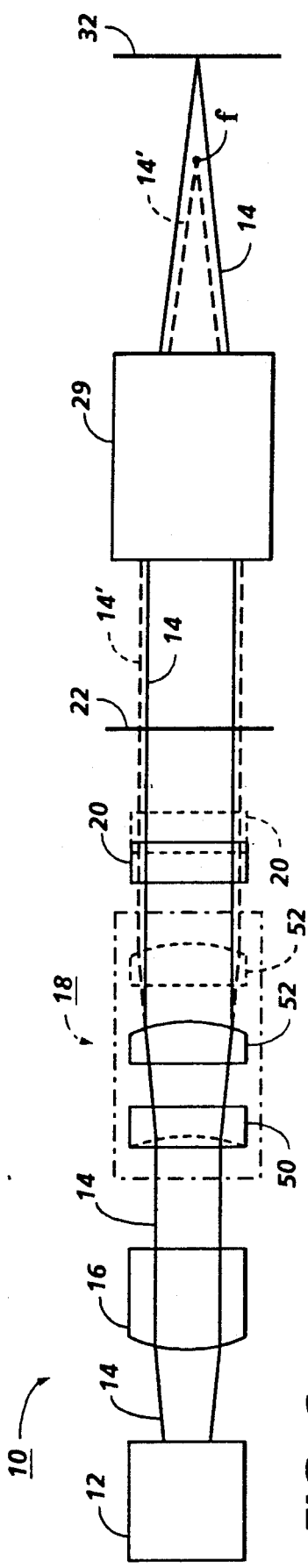
FIG. 2 is a tangential view of the raster scanning system of this invention showing the optical elements in the afocal Galilean focus error correction system.
Figure 3:
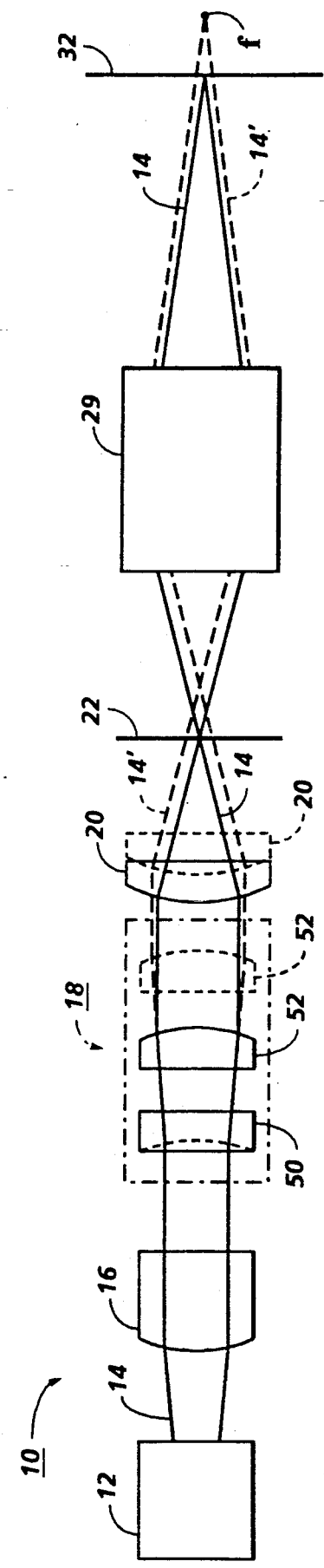
FIG. 3 is a sagittal view of the raster scanning system of FIG. 2.

Referring to FIGS. 2 and 3, there is shown a raster scanning system 10 of this invention which utilizes an afocal Galilean focus error correction system 18 while keeping the prior art pre-polygon cross-scan cylindrical lens 20. FIG. 2 shows a fast-scan or tangential view of the raster scanning system 10 and FIG. 3 shows a cross-scan or sagittal view of the raster scanning system 10. In both FIGS. 2 and 3, for the purpose of simplicity, the facet 22 of the polygon 24 is shown as line 22 and the reflected beam from the facet 22 is unfolded.

The afocal Galilean focus error correction system 18 comprises two lenses 50 and 52. The lenses 50 and 52 are spherical, affecting the light beam in both the scan and cross-scan plane. The lens 50 is concave on one side and planar on the other side and the lens 52 is planar on one side and convex on the opposite side. The afocal Galilean focus error correction system 18 receives a collimated beam and sends out a collimated beam in both the fast-scan and the cross-scan planes. In this system 18, one of the lenses 50 and 52 is fixed and the other lens is axially adjustable. The adjustability of any one of the lenses 50 and 52 provides a vehicle to correct the focus error. By adjusting the adjustable lens, a slight negative optical power or a slight positive optical power can be added to the beam.

It should be understood that by adding a slight negative optical power or a slight positive optical power, the collimated beam may slightly diverge or converge. Also, due to the manufacturing tolerances, the light beam from the collimator 16 may slightly diverge or converge. For the purpose of simplicity, hereinafter a collimated beam which may slightly diverge or converge will be referred to as a "collimated beam". Also, in the drawings for the purpose of simplicity any collimated beam which may slightly diverge or converge is shown as a collimated beam.

In the fast-scan plane, after passing through the lens 50, the beam 14 diverges. The diverging beam 14 then passes through lens 52 and the lens 52 collimates the beam 14. Since in the fast-scan plane the cylindrical lens 20 is planar the collimated beam passes through the cylindrical lens 20 without being altered.

In the cross-scan plane, after passing through the lens 50, the beam 14 diverges. The diverging beam 14 then passes through lens 52 and the lens 52 collimates the beam 14 and since in the cross-scan plane the cylindrical lens 20 which is a positive lens in the cross-scan plane, it converges the beam 14.

After the beam 14 passes through lens 20, it is reflected by the rotating polygon mirror 24. The post-scan optics 29 receives the reflected beam 14 from the rotating polygon mirror 24 and focuses the beam 14 onto or near the photoreceptor plane 32.

In operation, due to the aforementioned reasons, the beam 14 may focus at a focal point outside of the photoreceptor plane 32. For example, the beam may focus at a focal point f outside of the photoreceptor plane 32. In both FIGS. 2 and 3, the dashed line 14' represents the light beam traveling through the raster scanning system 10 which is not adjusted to correct the focus error and the solid line 14 represents the light beam traveling through the raster scanning system 10 which is adjusted to correct the focus error. As an example, in FIG. 2, the focus error is shown to occur before the photoreceptor plane 32 and in FIG. 3, the focus error is shown to occur beyond the photoreceptor plane 32. However, it should be noted that in both fast-scan plane and in the cross-scan plane the focus error can happen on either side of the photoreceptor plane 32.

By adjusting the afocal Galilean focus error correction system 18 of this invention and the pre-polygon cylindrical lens 20, the focal point can be adjusted to move onto the photoreceptor plane 32. In FIG. 2, the adjustable lens 52 is adjusted from the dashed line position into the solid line position to move the focal point onto the photoreceptor plane. In FIG. 3, the adjustable lens 20 is adjusted from the dashed line position into the solid line position to move the focal point onto the photoreceptor plane.

It should be noted that in the fast-scan plane the cylindrical lens 20 does not affect the light beam. Therefore, adjusting only the afocal Galilean focus error correction system 18 is enough to correct the focus error in the fast-scan plane. However, in the cross-scan plane, to correct the focus error, only the cylindrical lens 20 should be adjusted. As previously mentioned, the spherical lenses 50 and 52 of afocal Galilean focus error correction system 18 affects the beam 14 in both the fast-scan and the cross-scan planes. However, the cylindrical lens 20 can be adjusted to compensate for undesirable changes caused by the lenses 50 and 52 in the cross-scan plane in addition to correcting for errors due to manufacturing tolerances of the optical system.

It should also be noted that the raster scanning system of this invention is capable of correcting focus errors caused by any pre-polygon or post polygon optical element used in the raster scanning system.

Figure 4:
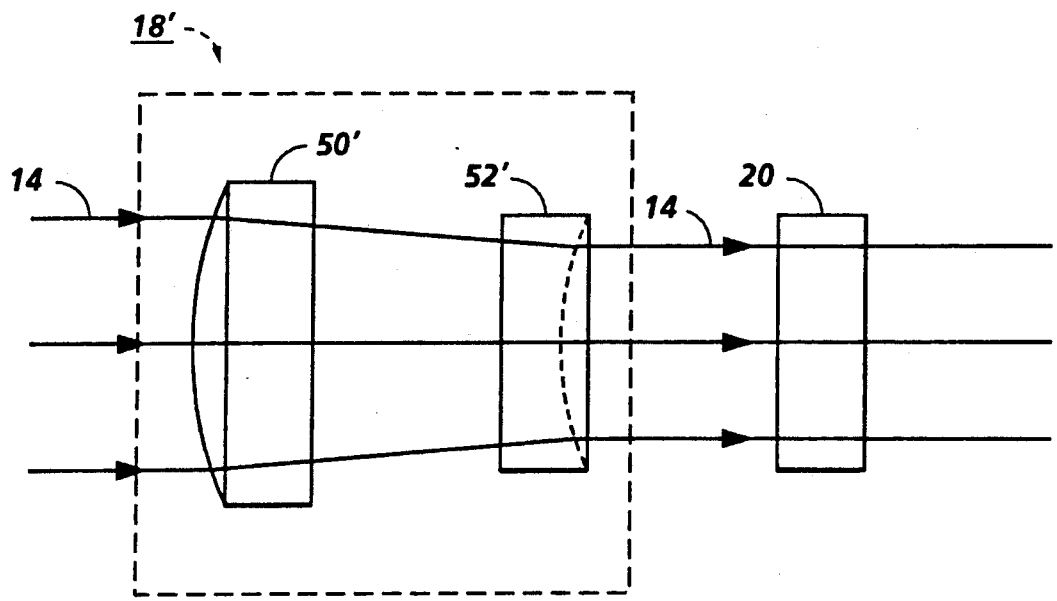
FIG. 4 is a tangential view showing the optical elements in an alternative afocal Galilean focus error correction system.
Figure 5:
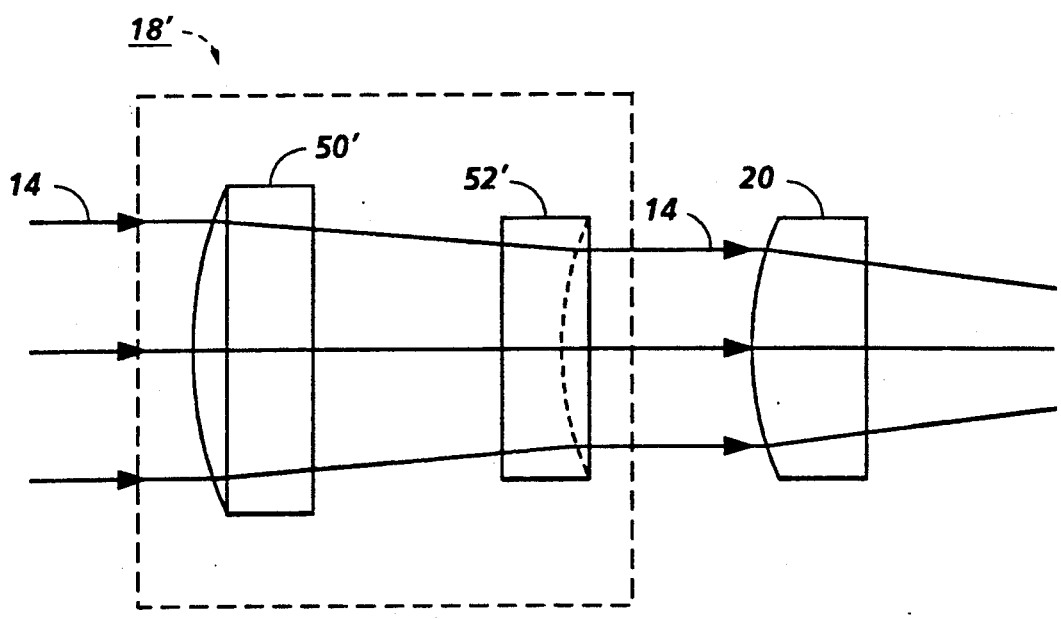
FIG. 5 is a sagittal view of FIG. 4.

An alternative afocal Galilean focus error correction system 18' is shown in FIGS. 4 and 5. FIG. 4 depicts a fast-scan view of an alternative afocal Galilean focus error correction system 18' and FIG. 5 depicts a cross-scan view of the alternative afocal Galilean focus error correction system 18'. This system 18' comprises two spherical lenses 50' and 52'. The lens 50' is convex on one side and planar on the other side and the lens 52' is planar on one side and concave on the opposite side. The afocal Galilean focus error correction system 18' receives a collimated beam and sends out a collimated beam in both the fast-scan and the cross-scan planes.

After passing through the lens 50', the beam 14 converges. The converging beam 14 then passes through lens 52' and the lens 52' collimates the beam 14. Referring to FIG. 4, since in the fast-scan plane the cylindrical lens 20 is planar, the collimated beam passes through the cylindrical lens 20 without any modification in the fast-scan plane. Referring to FIG. 5, since in the cross-scan plane the cylindrical lens 20 is a positive lens, it converges the beam 14.

Figure 6:
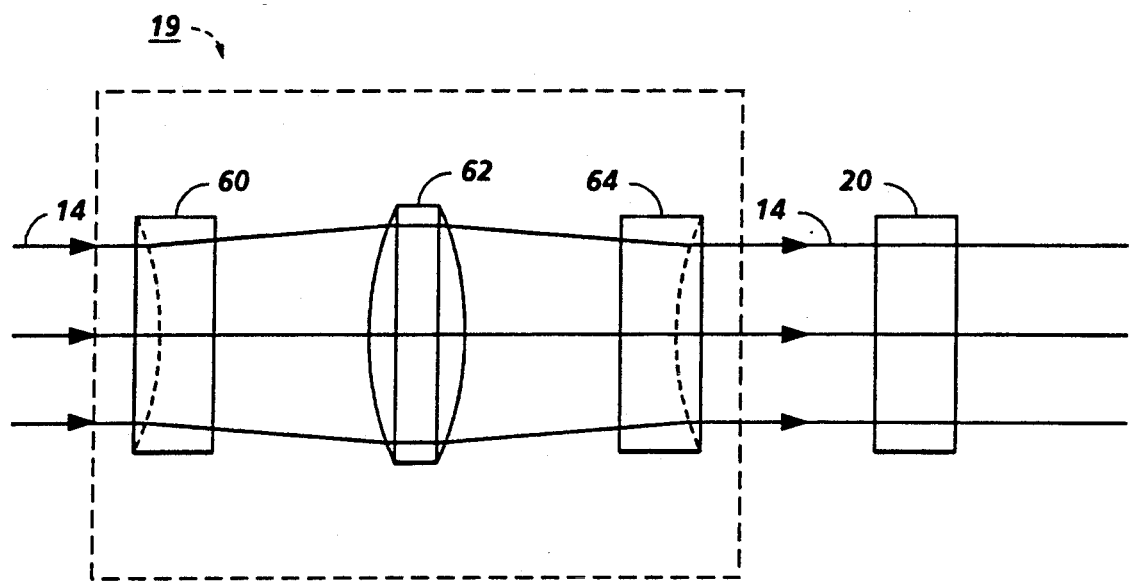
FIG. 6 is a tangential view showing the optical elements of another alternative afocal focus error correction system.
Figure 7:
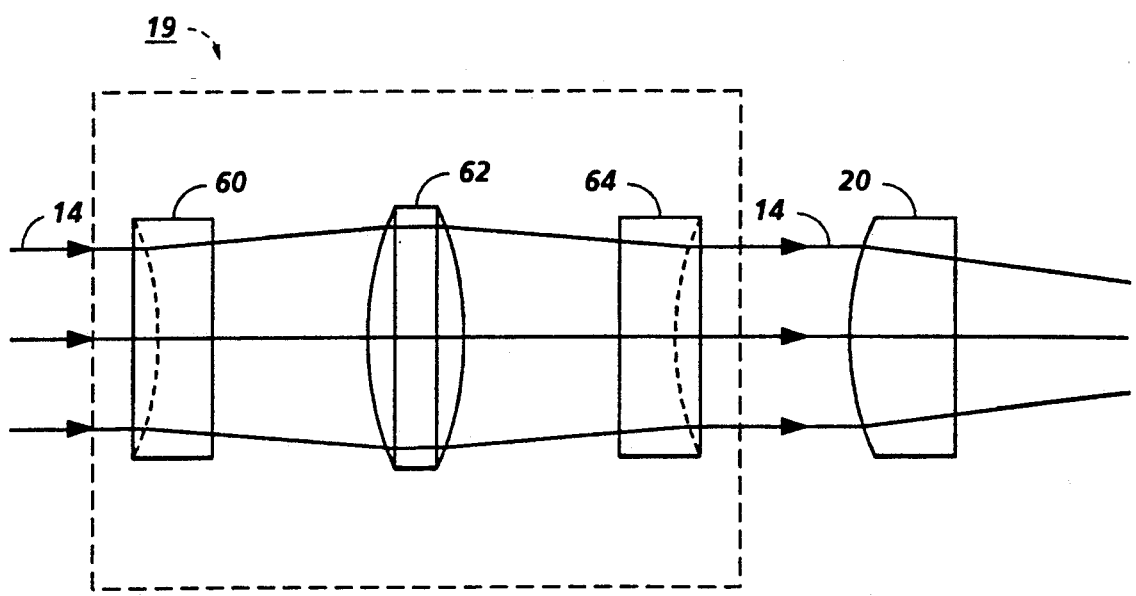
FIG. 7 is a sagittal view of FIG. 6.

An alternative to the afocal Galilean focus error correction systems 18 (FIGS. 2 and 3) and 18' (FIGS. 4 and 5) is shown in FIGS. 6 and 7. An afocal focus error correction system 19 comprises three lenses 60, 62 and 64. The lenses 60, 62 and 64 are spherical lens, affecting the light beam in both the scan and cross-scan plane. The lens 60 is concave on one side and planar on the other side, the lens 62 is convex on both sides and the lens 64 is planar on one side and concave on the opposite side. The afocal focus error correction system 19 receives a collimated beam and sends out a collimated beam in both the fast-scan and the cross-scan planes.

After passing through the lens 60, the collimated beam 14 diverges. The diverging beam 14 then passes through lens 62 and the lens 62 converges the beam 14. The converging beam 14 then passes through the lens 64 and finally, the lens 64 collimates the beam 14. Referring to FIG. 6, since in the fast-scan plane the cylindrical lens 20 is planar, the collimated beam passes through the cylindrical lens 20 without being altered. Referring to FIG. 7, since in the cross-scan plane the cylindrical lens 20 is a positive lens, it converges the beam 14.

In the afocal focus error correction system 19, any two of the lenses 60, 62 and 64 are fixed and the other one is axially adjustable. The adjustability of one of the lenses 60, 62 and 64 provides a vehicle to correct the focus error. By adjusting the adjustable lens, a slight negative optical power or a slight positive optical power can be added to the beam.

Figure 8:
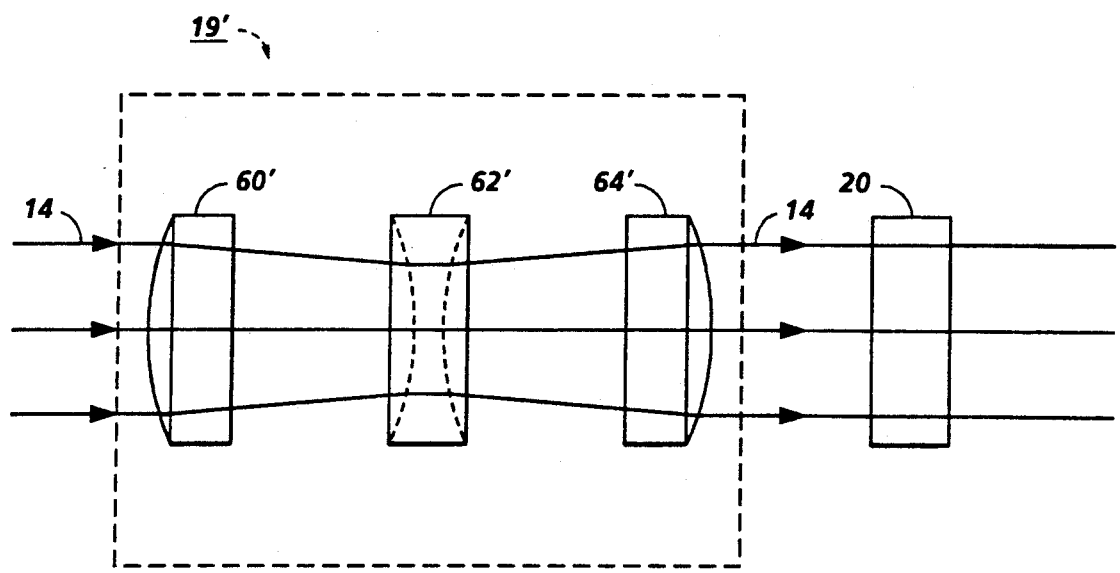
FIG. 8 is a tangential view showing the optical elements of still another alternative afocal focus error correction system.
Figure 9:
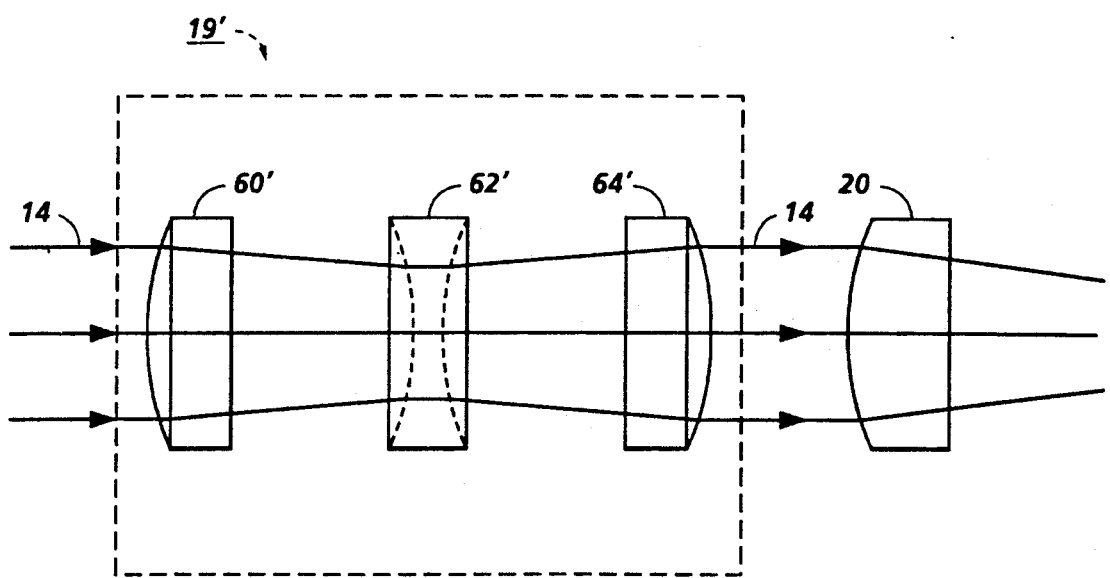
FIG. 9 is a sagittal view of FIG. 8.

An alternative to the afocal focus error correction system 19 (FIGS. 6 and 7) is shown in FIGS. 8 and 9. FIG. 8 depicts a fast-scan view of an alternative afocal focus error correction system 19' and FIG. 9 depicts a cross-scan view of the afocal focus error correction system 19'. The lenses 60', 62' and 64' are spherical lenses, affecting the light beam in both the scan and cross-scan plane. The lens 60' is convex on one side and planar on the other side, the lens 62' is concave on both sides and the lens 64' is planar on one side and convex on the opposite side. The afocal focus error correction system 19' receives a collimated beam and sends out a collimated beam in both the fast-scan and the cross-scan planes.

After passing through the lens 60', the collimated beam 14 converges. The converging beam 14 then passes through lens 62' and the lens 62' diverges the beam 14. The diverging beam 14 then passes through lens 64' and finally, the lens 64' collimates the beam 14. Referring to FIG. 8, since in the fast-scan plane the cylindrical lens 20 is planar, the collimated beam passes through the cylindrical lens 20 without being altered. Referring to FIG. 9, since in the cross-scan plane the cylindrical lens 20 is a positive lens, it converges the beam 14.

The preferred and the alternative embodiments of this invention each is capable of correcting the focus error without affecting the scanning characteristics of the post polygon optics. Utilizing one of the focus error correction systems of this invention to correct the focus error, both in the fast-scan plane and in the cross-scan plane, does not substantially change the scan magnification of the raster scanner system and therefore, does not substantially change the spot size. Furthermore, this invention provides an adjustment in the pre-polygon optics to correct the focus error without affecting the scanning characteristics of the post polygon optics such as linearity of scan line or wobble correction.

The lenses 50, 52, 50' and 52' in the afocal Galilean focus error correction systems 18 (FIGS. 2 and 3) and 18' (FIGS. 4 and 5) and the lenses 60, 62, 64, 60', 62' and 64' in the afocal focus error correction systems 19 (FIGS. 6 and 7) and 19' (FIGS. 8 and 9) can be designed to be cylindrical in the fast-scan plane, but planar in the cross-scan plane in order not to affect the beam 14 in the cross-scan plane. However, the cylindrical lenses are not as cost effective as the spherical lenses.

In addition, the focus error correction systems of this invention can be mechanized to correct any focus error automatically. The advantage of a mechanized focus error correction system is that the focus error caused by thermal and environmental changes which occur during operation can be corrected automatically. The automatic adjustment can be achieved through a sensor which senses the focus position and feeds back the amount of defocus to the alignment mechanism. Then, the alignment mechanism determines the amount of adjustment based on the amount of defocus and adjusts the adjustable lens.

It should be noted that one can design a focus error correction system by utilizing a Keplerian afocal system, but it should also be noted that the Keplerian afocal system is a longer system compared to the afocal Galilean system.

What is claimed is:

1. A raster scanning system with focus error correction system comprising;
    a light source emitting a light beam;
    collimating means in the path of the light beam for substantially collimating the light beam;
    a scanning means;
    an axially adjustable afocal means in the path of the light beam being located between said collimating means and said scanning means for altering the diameter of the substantially collimated light beam received thereby;
    an axially adjustable optical means being located between said afocal means and said scanning means in the path of the substantially collimated beam from said axially adjustable afocal means;
    said axially adjustable optical means being cylindrical in a sagittal plane for converging said substantially collimated light beam from said axially adjustable afocal means in the sagittal plane;
    said axially adjustable optical means being planar in a tangential plane whereby the substantially collimated light beam in the tangential plane is substantially unaltered;
    a medium; and
    a post scanning optical means being located between said scanning means and said medium for receiving said light beam from said scanning means and focusing said light beam onto said medium in both the tangential and sagittal planes.

2. The structure as recited in claim 1, wherein said axially adjustable afocal means comprises two spherical lenses.

3. The structure as recited in claim 2, wherein one of said spherical lenses is axially adjustable.

4. The structure as recited in claim 1, wherein said axially adjustable afocal means comprises two cylindrical lenses.

5. The structure as recited in claim 4, wherein one of said cylindrical lenses is axially adjustable.

6. The structure as recited in claim 1, wherein said axially adjustable afocal means comprises three spherical lenses.

7. The structure as recited in claim 6, wherein one of said spherical lenses is axially adjustable.

8. The structure as recited in claim 1, wherein said axially adjustable afocal means comprises three cylindrical lenses.

9. The structure as recited in claim 8, wherein one of said cylindrical lenses is axially adjustable.

10. The structure as recited in claim 1, wherein said axially adjustable optical means focuses said substantially collimated light beam from said axially adjustable afocal means in the sagittal plane on said scanning means.

* * * * *